F. J. MACKEY.
STACKER FOR HAY AND THE LIKE.
APPLICATION FILED SEPT. 24, 1913.

1,250,334.

Patented Dec. 18, 1917.
4 SHEETS—SHEET 1.

Inventor.
Floyd J. Mackey,

F. J. MACKEY.
STACKER FOR HAY AND THE LIKE.
APPLICATION FILED SEPT. 24, 1913.

1,250,334.

Patented Dec. 18, 1917.
4 SHEETS—SHEET 2.

Witnesses:
C. C. Palmer

Inventor:
Floyd J. Mackey,
By Chas. E. Lord
Atty.

F. J. MACKEY.
STACKER FOR HAY AND THE LIKE.
APPLICATION FILED SEPT. 24, 1913.

1,250,334.

Patented Dec. 18, 1917.
4 SHEETS—SHEET 3.

Witnesses:
C. C. Palmer

Inventor:
Floyd J. Mackey,
By Chas. E. Lord,
Atty.

F. J. MACKEY.
STACKER FOR HAY AND THE LIKE.
APPLICATION FILED SEPT. 24, 1913.
1,250,334.
Patented Dec. 18, 1917.
4 SHEETS—SHEET 4.
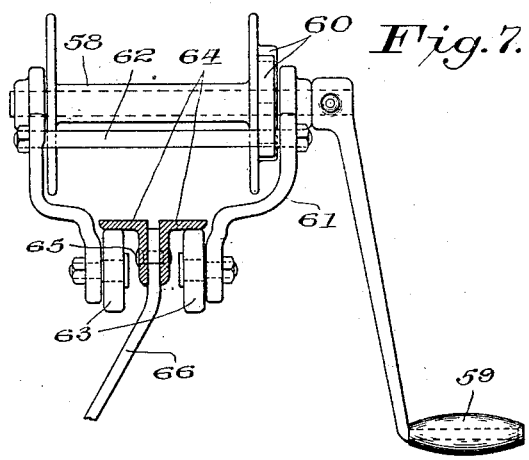
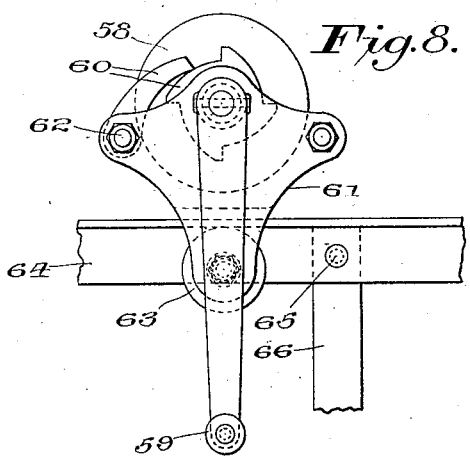
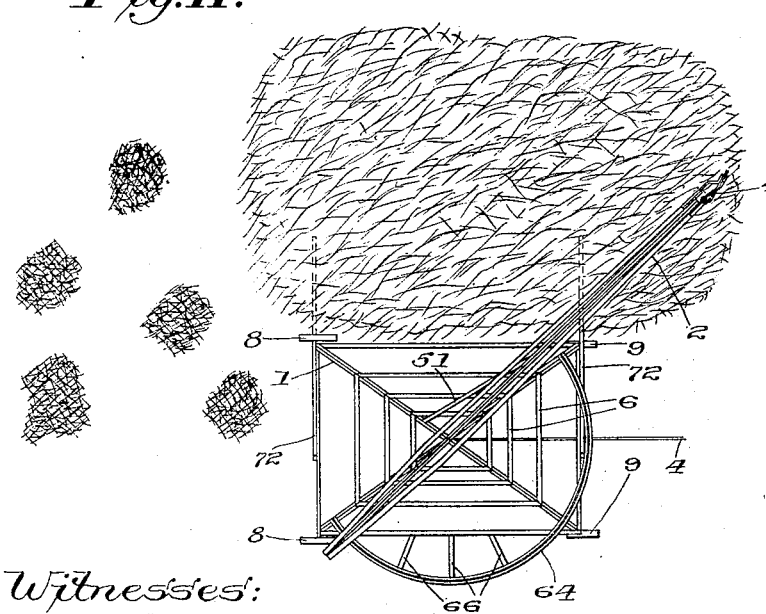
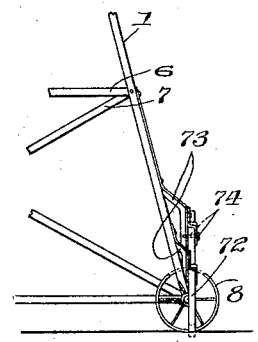
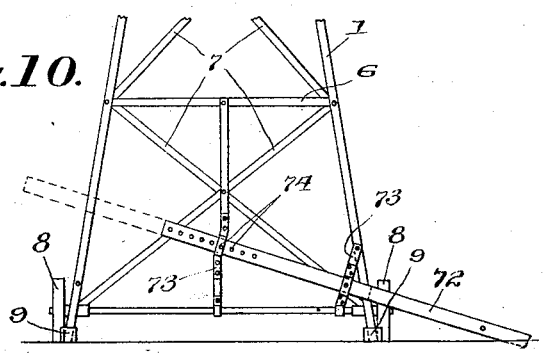
Witnesses:
Inventor:
Floyd J. Mackey,
By
Atty.

UNITED STATES PATENT OFFICE.

FLOYD J. MACKEY, OF CHICAGO, ILLINOIS, ASSIGNOR TO INTERNATIONAL HARVESTER COMPANY OF NEW JERSEY, A CORPORATION OF NEW JERSEY.

STACKER FOR HAY AND THE LIKE.

1,250,334.  Specification of Letters Patent.  Patented Dec. 18, 1917.

Application filed September 24, 1913. Serial No. 791,484.

*To all whom it may concern:*

Be it known that I, FLOYD J. MACKEY, a citizen of the United States, residing at Chicago, in the county of Cook and State of Illinois, have invented certain new and useful Improvements in Stackers for Hay and the Like, of which the following is a full, clear, and exact specification.

My invention relates to stackers for hay and the like.

It has for its object to improve and simplify the construction of hay stackers of the swinging boom type, render the same readily adapted to use under varying service conditions, increase the capacity of the same by giving the stacker a wider range of operation and improve the controlling and adjusting mechanism therefor. I attain these objects by the provision of a stacker of improved construction provided with improved adjusting and controlling mechanism hereinafter described.

In the accompanying drawings I have illustrated one embodiment which my invention may assume in practice. It is to be understood, however, that the form shown is used for purposes of illustration and may be modified without departing from the spirit of the invention.

Fig. 7 is a side elevation of the traveling windlass, the support being shown in section.

Fig. 8 is an end elevation of the windlass.

Fig. 9 is an end elevation of the adjustable stacker stake.

Fig. 10 is a view of the same taken at right angles to that shown in Fig. 9.

Fig. 11 is a top plan view of the stacker illustrating the same diagrammatically as it is used in stacking.

Figure 1:
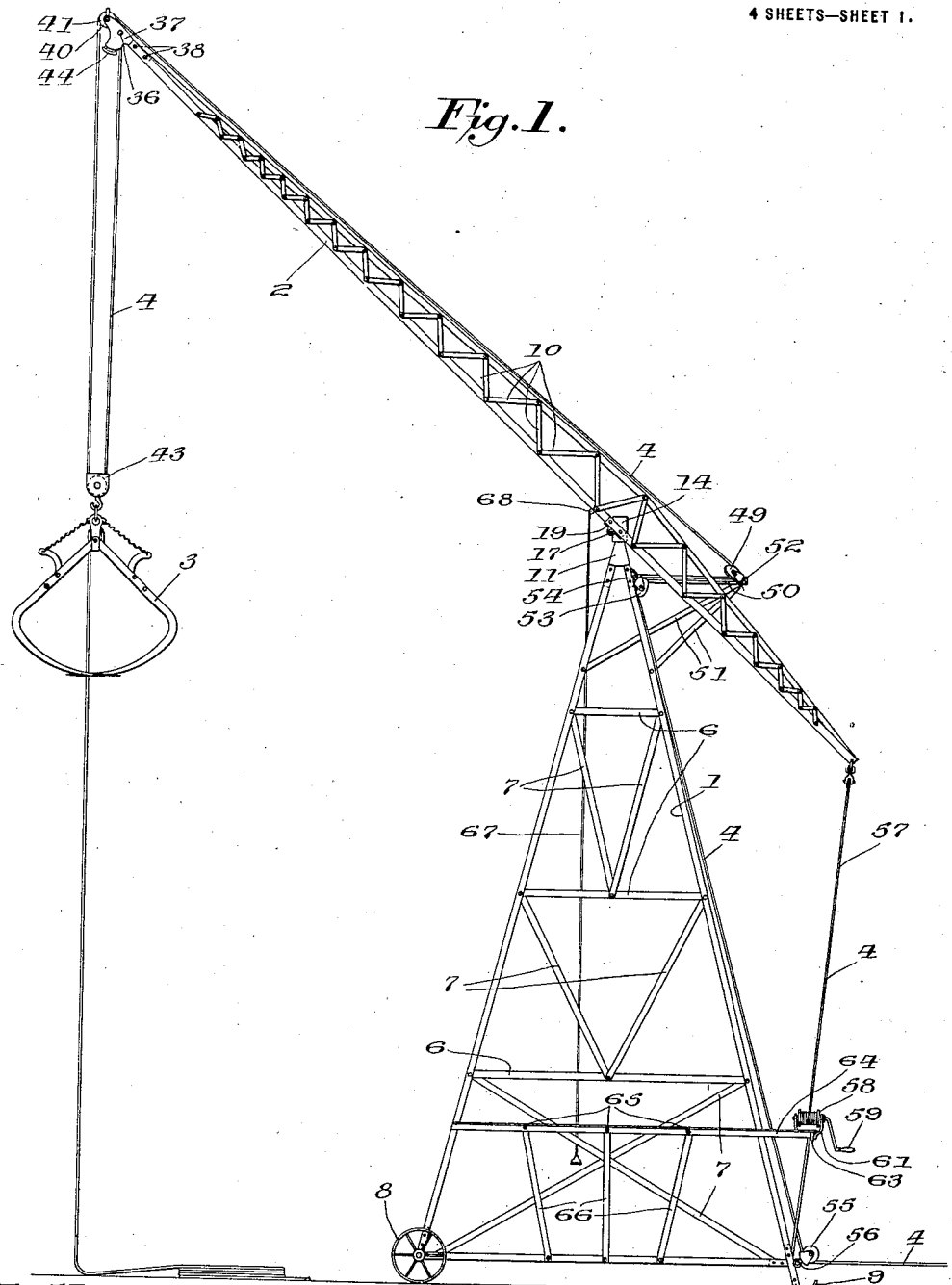
Figure 1 is a side elevation of this form of stacker.
Figure 2:
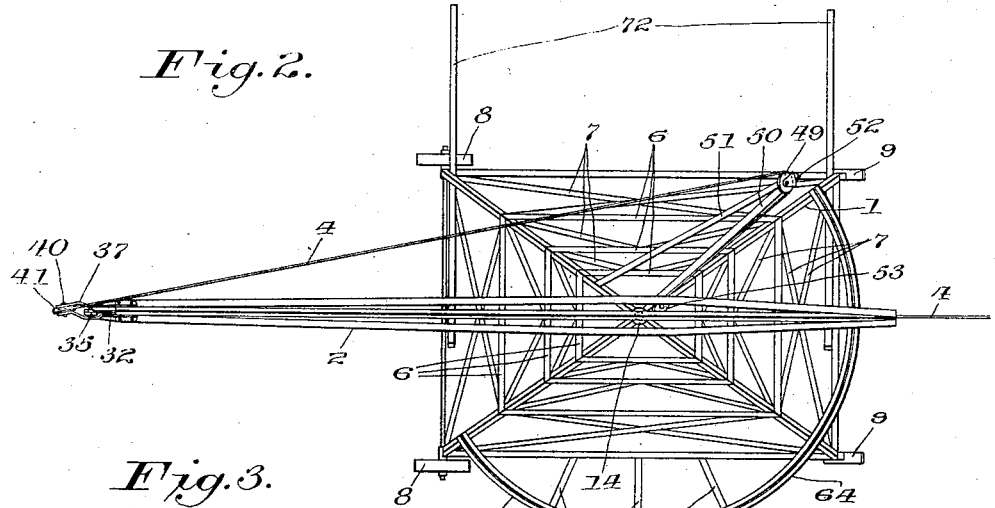
Fig. 2 is a top plan view of the same.

The stacker shown when broadly considered comprises an upstanding frame 1 of substantially pyramidal shape having a jib 2 pivoted thereon intermediate its ends, the said jib carrying a hay fork 3 suspended on a rope 4 and being adjustable about a pivot on the frame 1, either in a vertical or horizontal direction, and being capable of swinging around the standard to any desired position, improved controlling and adjusting mechanism for the jib and fork being provided as hereinafter described.

As shown, the frame 1 is substantially pyramidal in shape and of skeleton steel construction braced by suitable transverse braces 6 extending between its converging upwardly extending side members and intermediate braces 7 connecting the several transverse members 6. As shown, these braces 7 are rigidly connected at the ends of certain of the members 6 and brought together at their lower ends where they are connected at substantially the middle point of the lower members 6. As in the usual construction a plurality of transport wheels 8 are provided at one end of the frame. Upon the other end of the same skids 9 are provided, the combination of skids and transport wheels enabling the frame to be readily moved from place to place as desired.

Journaled upon the upper end of the frame 1 is the jib 2. This jib, as shown, comprises a section of steel truss construction tapering toward its ends, bracing members 10 being disposed diagonally along the length of the same to give the jib greater rigidity and strength. At a point intermediate its ends and a substantial distance from the load carrying end of the jib the latter is journaled on a cap 11 fixed on the upper pyramidal end of the frame 1. As shown, this cap 11 is in the form of a casting rigidly connected to the frame 1 by means of bolts 12 and provided with an upstanding cylindrical bearing member 13. This member 13 is seated in a sleeve 14 carried upon the jib 2, roller bearings 15 being interposed between the bearing member 13 and the sleeve 14 to facilitate rotary movement of the latter with respect to the stationary mast. As shown, the sleeve 14 is provided with integral laterally and downwardly extending lugs 16 disposed parallel to each other and projecting from opposite sides of the sleeve. These lugs are provided with openings in their ends through which protrude pivot pins 17 carried on the jib 2. As shown, these lugs are positioned with respect to these pivot pins by suitable cotter pins 18, and the pivot pins 17 are rigidly attached to plates 19 fixed by bolts 20 upon the sides of the jib 2, suitable lugs 21 being provided on the plates 19 to position the extensions 16 upon the pins 17. As shown, both this sleeve 14 and the cap 11 on the frame are also provided with a laterally extending horizontally disposed lug 22 between the arms 16 which have notches 23 therein adapted to receive the inner end of the plunger 24. This plunger is carried on a plate 25, which is in turn supported on a transversely disposed plate 26 attached at 27 to the lower side members of the jib, the plunger 24 being longitudinally reciprocable in suitable bearings 28 carried on the longitudinally extending plate 25 and being normally held in its projected position by means of a coiled spring 29 positioned between the bearing member 28 and the wall of an end plate 30 which likewise forms a bearing member for the plunger and coöperates with the bearing 28.

Figure 3:
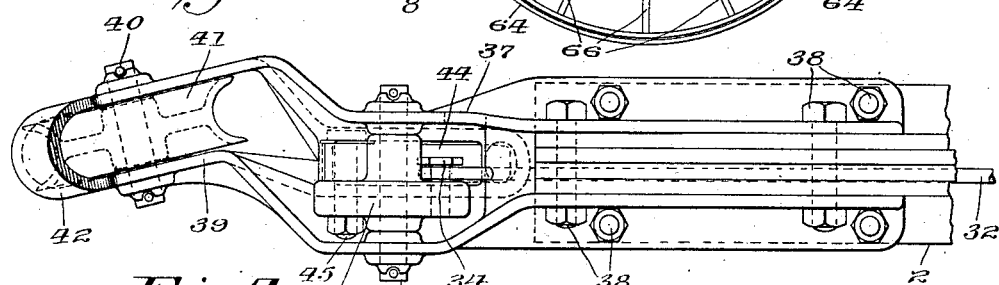
Fig. 3 is a detail plan view of the block actuated mechanism carried on the jib.
Figure 4:
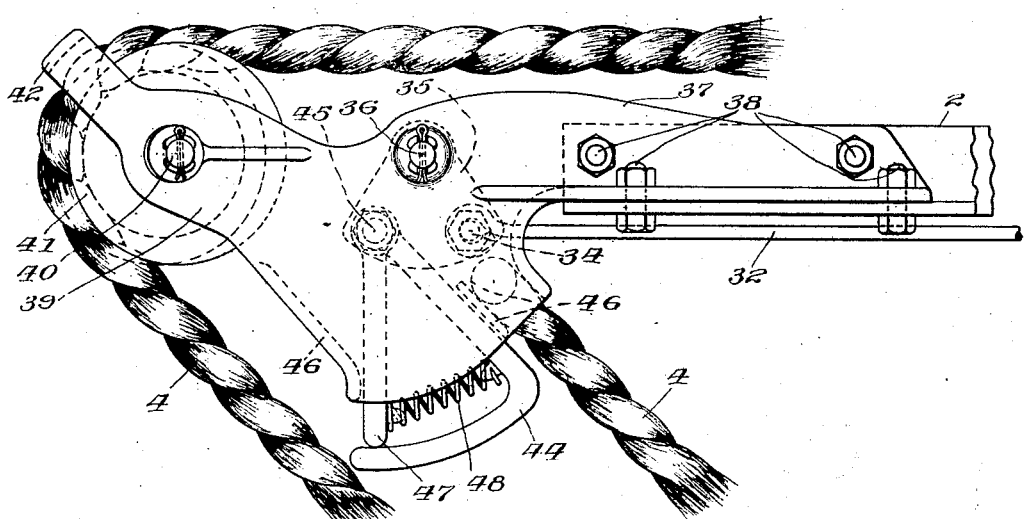
Fig. 4 is a side elevation of the construction shown in Fig. 3 with the ropes in position.
Figure 5:
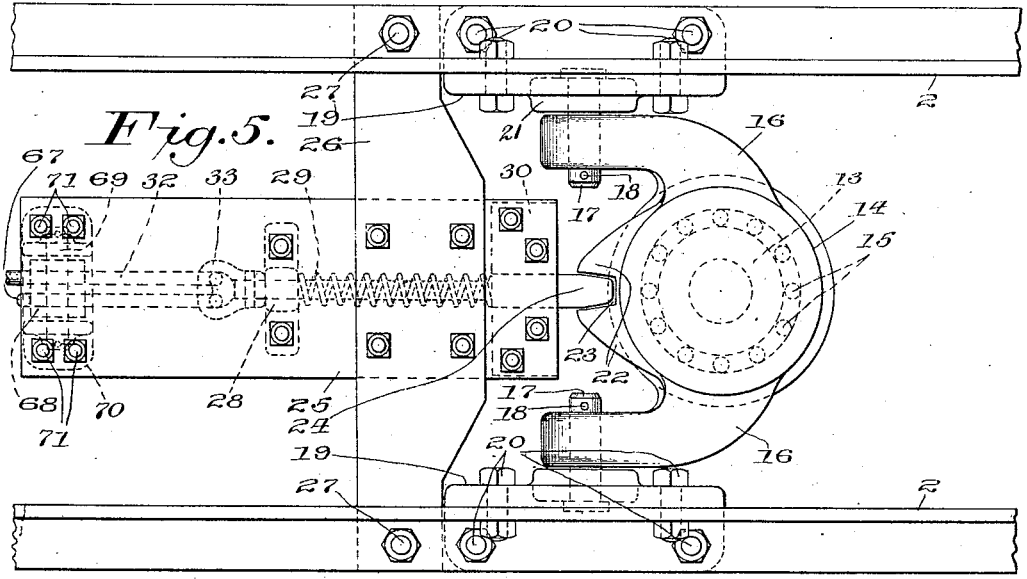
Fig. 5 is a detail top plan view of the jib latch mechanism.
Figure 6:
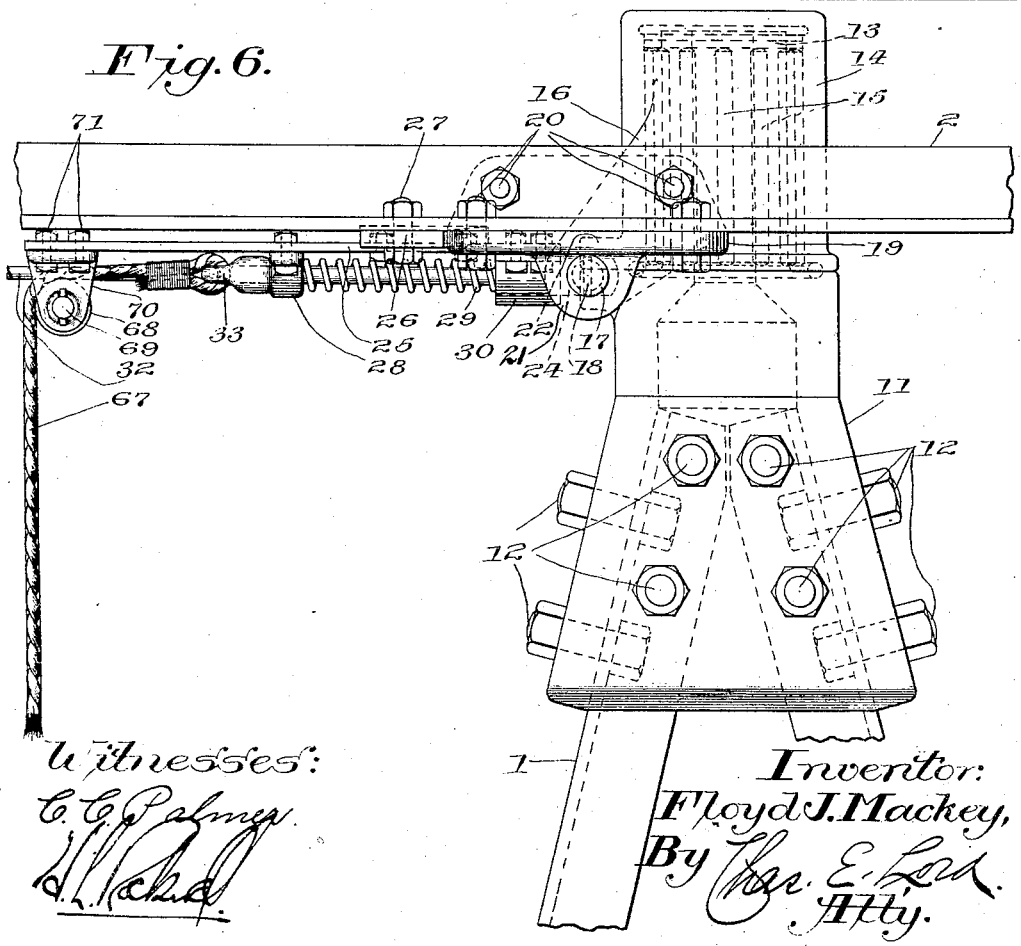
Fig. 6 is a side elevation of the same.

This plunger 24 is operatively connected to the load carrying mechanism through a connecting member or link 32 attached to a ring 33 on the outer end of the same. This connecting member 32 extends outward along the jib 2 to the load carrying end of the same where it is pivotally connected to a pin 34 carried on an oscillating segmental plate 35 which is in turn pivoted at 36 to a bracket member 37. As shown, this bracket member is attached to the jib 2 by any suitable attaching means 38 and projects beyond the end of the jib and angularly therefrom at an angle of substantially 45 degrees, being provided with a projection 39 on its end disposed at an angle of 45 degrees to it and 15 degrees to the body of the jib (Fig. 3), in which is journaled at 40 a sheave 41, the projection 39 being protruded around the sheave as at 42 to protect the same and maintain therein the rope 4 which carries the fork 3. As in the usual manner a block 43 is suspended on this rope and the fork is attached thereto, the block being raised as the rope 4 is drawn over the sheave 41. As the block rises it is to be noted that it strikes against a substantially L-shaped member 44 which is pivoted at 45 to the opposite corner of the plate 35 from the point of connection of the link 32, causing the L-shaped member 44 to be driven backward and rocking the plate 35 about its pivot 36. It is to be noted that by this movement the link 32 is pulled outward so that the plunger 24 is withdrawn from the notch 23 in the cap 11 and the jib is freed so that the latter may rotate freely with respect to the main frame 1. During this inward movement the L-shaped member 44 is guided by a plurality of spaced shoulders 46 formed on the bracket member 37 and coöperating with the long shank of the member 44, and a supplemental arm 47 coöperating therewith and attached to the same pivot 45. Further, in order to return the member 44 to its initial position after the block has been disengaged therefrom, a spring 48 is provided which is positioned between the adjacent surfaces of the long shank on the member 44 and the member 47.

As shown, one end of the rope 4 is attached to the bracket 37 at a point substantially beneath the link pivot 34, and the fork is suspended from the rope between this end and the sheave 41. After it has passed over the sheave it is to be noted that it is carried downwardly and laterally from the bracket 37 at the side of the jib and toward the frame to a sheave 49 which is carried on the outer end of a laterally projecting horizontally disposed boom 50 fixed to the main frame and braced with respect thereto by suitable supporting braces 51. As shown, this sheave 49 is angularly movable with respect to the boom through pivotal connections 52 and is so disposed with respect to the sheave 41 that the rope or cable 4 may freely pass over the two sheaves 41 and 49 in any position of the jib. From this sheave 49 the rope next extends inwardly along the boom 50 and passes over a sheave 53 attached to the frame 1 at 54 and then extends downwardly substantially parallel to one of the frame members to a bottom sheave 55 pivotally attached to the bottom of frame 1 at 56 at a point between the skids 9. From this point the rope extends out parallel to the ground in a suitable manner to be attached to any source of power adapted to draw the same outward and allow the return of the same to vary the elevation of the block 43 and fork 3.

Coöperating with this mechanism for raising the load and releasing the jib 2 is means for adjusting the jib vertically with respect to the frame 1. As shown, the short or non-load carrying end of the jib is connected through a rope or cable 57 to a windlass 58 having a handle 59 locked in position by a suitable ratchet mechanism 60. As shown, this windlass is journaled in suitably spaced bracket members 61 and these bracket members are rigidly connected together by bolts 62 at points at the sides of the windlass and are provided at their lower ends with carrying rollers 63. As shown, these rollers engage the lower surfaces of the horizontal flanges on a plurality of strips of angle material 64 attached at 65 to the opposite sides of upstanding outwardly protruding braces 66 fixed to the bottom of the main frame 1, the members 64 being bent into semi-circular shape and disposed parallel to the ground in such a manner as to form a track which extends half way around the frame 1 at a point adjacent the ground, one end of the track terminating at a point substantially beneath the sheave 49, while the other extends around to a point substantially diametrically opposite the same.

In order that if desired the jib 2 may be swung prior to the time that the block 43 engages with the latch operating member 44, I have provided hand operating mechanism for this latch mechanism which enables the operator on the ground to release the jib from the standard and permit the jib to be swung around on the standard at any desired time. This means is shown to comprise a rope 67 which is connected to the ring 33 on the end of the plunger 24 and extends outward therefrom substantially parallel to the operating member or link 32 and then downward to a point within reach of the operator. As shown, in order to facilitate the movement of the plunger 24 by both the link 32 and the rope 67, a roller 68 is preferably journaled at 69 in a bracket 70 attached at 71 to the under side of the jib 2 near the outer end of the plunger and both the rope 67 and the link 32 are passed over this roller, the rope extending downward therefrom. Obviously, if desired a plurality of these rollers may be provided at points along the length of the jib to further facilitate the movement of the link 32.

In order to position the stacker relative to the stack and maintain the same in proper position during the stacking operation, I have provided stakes 72 therefor. These stakes are shown to be reciprocable in guides or brackets 73 carried on opposite sides of the frame 1 at the base thereof and are disposed angularly downward with respect to the horizontal so that when driven downward through the bracket members or guides 73 the lower ends of the same will be driven into the ground and thus effectually prevent rocking of the main frame 1. It is to be noted that by the provision of coöperating pin and hole connections 74 I am able to securely position these stakes with respect to the frame and that when it is not desired to use the stakes to position the same with respect to the ground, the stakes may be pushed backward in the guides 73 and positioned by these same pin connections 74 in such position that they will not interfere in any way with the movement of the stacker from place to place, the stakes then assuming the positions shown in dotted lines in Fig. 10.

The operation of the construction shown is as follows: Assuming that the load is in the position indicated by any of the small bunches of hay illustrated at the left of Fig. 11 and that the stack is indicated by the larger mass shown at the right, the stakes 72 are projected laterally in such a manner as to be under the stack when the same is formed. In the initial position of the stacker it occupies the position shown in Fig. 1. Obviously, to lower the fork, the rope 4 is retracted and the fork dropped over one of the small bunches of hay, the same representing, for instance, the load on a sweep rake. After the fork has been filled in the usual manner the rope 4 is drawn up by exerting a pull on its free end in any suitable manner as by driving the lifting team away from the stack. When the block 43 strikes the member 44 the plate 35 is rocked about its pivot 36 to reciprocate the link 32 and withdraw the plunger 34 from the notch 23, freeing the jib so that it may move angularly with respect to the frame 1. A continued movement of the rope 4 after this release of the jib then acts to turn the latter about on its axis on the frame 1 due to the offset relation of the sheave 49, the jib swinging about over the stack. Obviously, as in the usual manner, the load may be released from the fork 3 by pulling any suitable controlling rope therefor when the load occupies the desired position above the stack. It is to be noted that during this movement the jib through its connection with the track 64, is maintained at a predetermined height with respect to the ground, the load on the fork tending to maintain the rollers 63 and the bracket 61 in engagement with the under side of the track 64 and carry the windlass around on the track as the jib moves around. Obviously, as the stack is built higher, the elevation of the jib may be readily adjusted by turning the crank 59 to raise or lower the end of the jib, the ratchet mechanism 60 serving to lock the windlass in any predetermined position. As heretofore described, the operator may also release the jib from the frame prior to the time that the block engages the tripping member 44, as, for instance, in building a low stack or loading a wagon, by pulling upon the rope 67, the effect of this pull being the same as that produced by the block 43 striking the latch operating mechanism, the jib then being freed to rotate to the desired position.

While I have described one form of my invention specifically in this application, it is to be understood that the form chosen for illustration is simply illustrative of my invention and that the specific embodiment thereof shown may be modified.

What I claim as my invention and desire to secure by Letters Patent is:—

1. In a stacking machine, a frame, a jib pivotally mounted thereon at a point intermediate its ends, means for elevating a load while the jib is stationary, an arcuate track carried on said frame beneath said jib, and means operatively connected to one end of said jib and adjustable along said track for varying the angle of said jib with respect to the ground.

2. In a stacking machine, a frame, a jib rotatably mounted thereon at a point intermediate its ends, an arcuate track carried on said frame at a point adjacent the ground, and means including a traveling windlass operatively connected to one end of said jib positioning said jib at a given angle with respect to the ground and movable along said track as said jib is rotated.

3. In a stacking machine, a frame, a jib pivoted thereon and freely movable in either a vertical or horizontal plane with respect thereto, load carrying mechanism adjustably mounted on said jib, means automatically actuated by said load carrying mechanism normally locking said jib to said frame, and a traveling windlass for varying the angle of said jib with respect to the ground.

4. In a stacking machine, a frame having an upstanding spindle thereon and a notch therein adjacent said spindle, a bearing member rotatably mounted on said spindle, a jib operatively connected to said bearing member, and a latch reciprocably mounted on said jib engaging the notch in said frame.

5. In a stacking machine, a frame having a notch therein, a bearing member rotatably mounted thereon adjacent said notch, a jib operatively connected to said bearing member, load carrying mechanism carried on said jib, and plunger mechanism carried on said jib and normally engaging the notch in said frame, said plunger mechanism being controlled by the load carrying mechanism.

6. In a stacking machine, a frame, a bearing member rotatably mounted thereon, a jib operatively connected thereto, a spring pressed latch reciprocably mounted on said jib and normally engaging said frame, a trip carried on said jib, adjustable load carrying mechanism suspended from said jib engaging said trip when in a predetermined position, and means transmitting the operation of said trip to said latch to release said jib from said frame.

7. In a stacking machine, a frame, a jib pivoted thereon, a bracket carried on one end thereof, a segment having one corner of the same pivotally mounted on said bracket, a tripping member pivotally mounted at another corner of said segment, and a controlled member operatively connected to the remaining corner of said segment and operated upon movement of said trip and segment to control the movement of said jib.

8. In a stacking machine, a frame, a jib pivoted thereon, a supporting bracket, a segment pivotally mounted therein at one of its corners, a tripping member pivotally mounted on said segment at another of its corners and reciprocable with respect to said bracket, and a controlled member pivotally connected to the remaining corner of said segment operated upon movement of said segment and tripping member to control the movement of said jib.

9. In a stacker, a jib, a bracket member rigidly attached to the end thereof and protruding beyond the end of the same, said bracket member having an upstanding extension disposed at an angle with respect to the longitudinal axis of said jib, a sheave journaled in said extension, a hoisting rope extending over said sheave and having one end attached to said bracket, load carrying mechanism suspended from said rope, and a trip pivotally mounted on said bracket in the path of said load carrying mechanism for controlling movement of said jib.

10. In a stacking machine, a frame, a jib pivoted thereon, a bracket member rigidly attached to the end thereof, a sheave journaled in said bracket, a hoisting rope extending over said sheave and having one end fixed with respect to said jib, a segment pivoted on said bracket, a substantially L-shaped spring pressed trip movable with respect to said bracket and guided thereby pivoted to said segment, load carrying mechanism suspended from said rope engaging said trip, and a controlled member pivotally connected to said segment and operated upon movement of said trip for controlling the movement of said jib.

In testimony whereof I affix my signature, in the presence of two witnesses.

FLOYD J. MACKEY.

Witnesses:
N. J. WAGNER,
W. HUTCHISON.